(12) United States Patent
Duarte De Martin et al.

(10) Patent No.: US 10,216,452 B2
(45) Date of Patent: Feb. 26, 2019

(54) BREACH DETECTION IN INTEGRATED CIRCUITS

(71) Applicant: FREESCALE SEMICONDUCTOR, INC., Austin, TX (US)

(72) Inventors: Fabio Duarte De Martin, Campinas (BR); Andre Luis Vilas Boas, Campinas (BR); Guilherme Godoi, Campinas (BR)

(73) Assignee: NXP USA, Inc., Austin, TX (US)

( * ) Notice: Subject to any disclaimer, the term of this patent is extended or adjusted under 35 U.S.C. 154(b) by 225 days.

(21) Appl. No.: 15/210,567

(22) Filed: Jul. 14, 2016

(65) Prior Publication Data

US 2018/0018125 A1 Jan. 18, 2018

(51) Int. Cl.
*G06F 3/06* (2006.01)
*G06F 21/86* (2013.01)
*H01L 23/00* (2006.01)

(52) U.S. Cl.
CPC ............ *G06F 3/0652* (2013.01); *G06F 3/064* (2013.01); *G06F 3/0623* (2013.01); *G06F 3/0679* (2013.01); *G06F 21/86* (2013.01); *H01L 23/57* (2013.01)

(58) Field of Classification Search
None
See application file for complete search history.

(56) References Cited

U.S. PATENT DOCUMENTS

| | | | |
|---|---|---|---|
| 6,292,898 B1 * | 9/2001 | Sutherland | G06F 21/87 713/193 |
| 7,119,703 B2 | 10/2006 | Sin | |
| 7,723,998 B2 | 5/2010 | Doi | |
| 7,989,918 B2 | 8/2011 | Bartley et al. | |
| 8,296,845 B2 | 10/2012 | Derouet | |
| 8,896,086 B1 | 11/2014 | Arora et al. | |
| 2004/0212017 A1 * | 10/2004 | Mizuno | G06F 21/86 257/368 |
| 2006/0044138 A1 * | 3/2006 | Sin | G06F 21/87 340/568.2 |

* cited by examiner

*Primary Examiner* — Henry Tsang

(57) ABSTRACT

An apparatus embodiment includes an integrated circuit (IC) and breach-detection circuitry. The IC includes data storage circuitry, a power grid configured to distribute power to the data storage circuitry, and a plurality of nodes distributed over at least one sensitive region of the IC. The breach-detection circuitry monitors power grid integrity at the at least one sensitive region of the IC and detects an event indicative of a breach by an external probe at a portion of the at least one sensitive region in response to floating node detection or a change in voltage at one of the plurality of nodes.

18 Claims, 6 Drawing Sheets

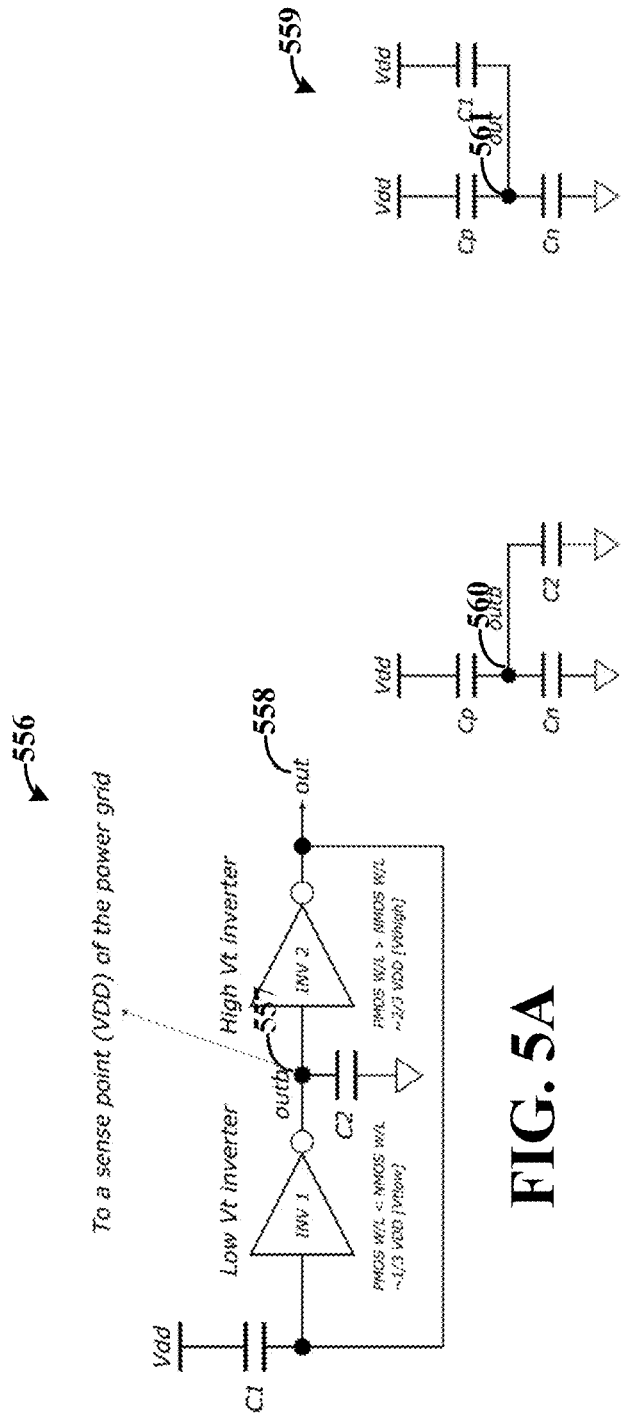

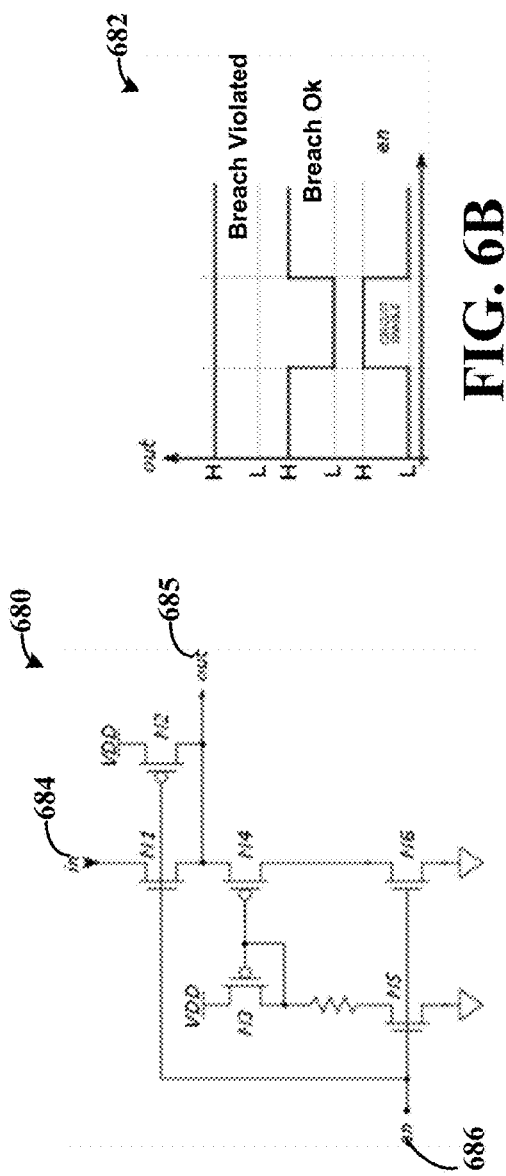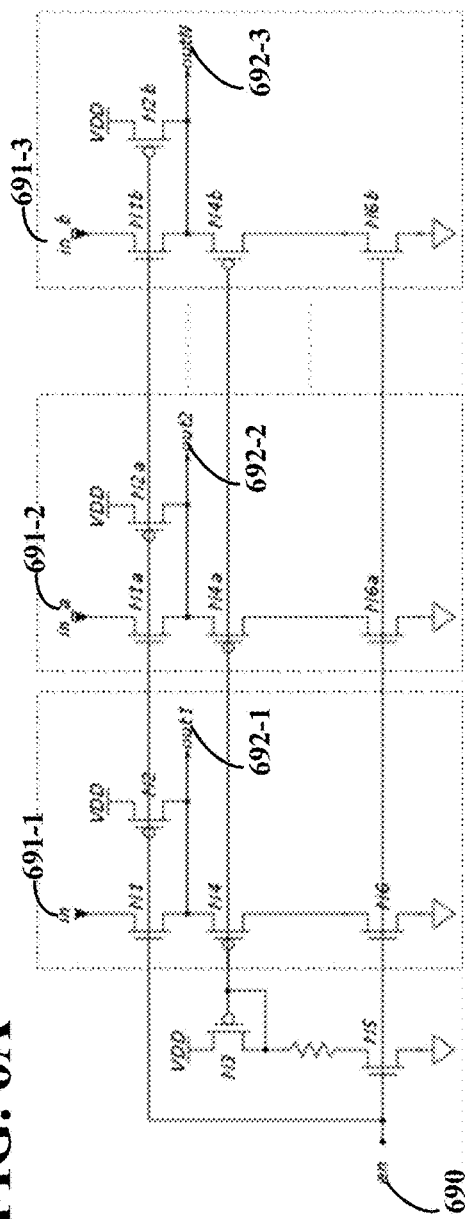
FIG. 6A
FIG. 6B
FIG. 6C

BREACH DETECTION IN INTEGRATED CIRCUITS

Aspects of the instant disclosure are directed to detection of a breach of the integrated circuits.

Integrated circuits (IC) or IC packages, such as those used in set-top boxes, engine control units (ECUs), smart cards and/or credit cards, can store security data including personal data, financial transaction authorization codes, security passwords, and secure session keys, among other sensitive information. Because of the security data, ICs are prone to unauthorized access by hackers. One technique used by hackers to gain access to information residing in an IC is micro-probing. Micro-probing involves forming an electrical contact with the IC by dropping an external probe, such as a fine-tipped probe needle, directly on a portion of the IC, such as an area which the security data is or may be stored. The external probe is held by a micro-manipulator that is controlled by the hacker to precisely land the probe on the IC.

To protect ICs from micro-probing, static wire-meshes can be placed close to the area that stores the security data. For example, a static wire-mesh is formed by two sets of wires. A first set of wires is connected to supply voltage (VDD) and to a first (e.g., low) active tampering line of detection circuitry. A second set of wires is connected to ground (GND) and to a second (e.g., high) active tampering line of the detection circuitry. The first set of wires and second set of wires are placed in an alternating pattern to form the static wire-mesh. If wire segments of the static wire-mesh are contacted by an external probe, the corresponding first and/or second tampering lines are activated to detect tampering. The static wire-mesh can be cut and bypassed by the hacker as a static voltage is used for detecting tampering. For example, as the wire segments are at a constant potential, a hacker can short and cut wire segments without activating the tampering lines.

These and other matters have presented challenges to detecting breach of ICs and prevent access to security data, for a variety of applications.

SUMMARY

Various example embodiments are directed to issues such as those addressed above and/or others which may become apparent from the following disclosure concerning breach detection in ICs.

In certain example embodiments, aspects of the present disclosure involve monitoring a power grid that distributes power to circuitry of an IC using a plurality of nodes distributed over at least one sensitive region of the IC. An event indicative of breach (e.g., tampering) by an external probe can be detected at a portion of the at least one sensitive region responsive to a floating node detection or a change in voltage at one of the plurality of nodes.

According to various aspects of the presented disclosure there is provided an apparatus that includes an IC having data storage circuitry, a power grid to distribute power to the data storage circuitry, and a plurality of nodes distributed over at least one sensitive region of the IC. The sensitive region of the IC includes data storage circuitry that stores security data, such as personal data, financial transaction authorization codes, security passwords, and/or secure session keys, among other data. The apparatus further includes breach-detection circuitry that monitors power grid integrity at the at least one sensitive region. The breach-detection circuitry detects an event indicative of a breach by an external probe at a portion of the at least one sensitive region in response to a floating node detection or a change in voltage at one of the plurality of nodes. For example, the plurality of nodes can be located at intersections of a first layer (e.g., upper power supply rails or ground rails) and a second layer (e.g., lower power supply rails or ground rails) of the power grid. The nodes, prior to any breach (e.g., tampering), are biased with supply power or ground. In response to breakage of the power grid by the external probe at the sensitive region, at least one of the plurality of nodes has a change in voltage or is floating (e.g., changes from being biased with supply power or ground to floating).

In one or more embodiments, the plurality of nodes include a multitude of nodes. A multitude of nodes can include at least one node per intersection of the first and second layer of the power grid corresponding to the at least one sensitive region and as many as practically possible as is limited by the IC. The plurality of nodes can be located at intersections of a first power supply layer (e.g., upper power supply rails) and a second power supply layer (e.g., lower power supply rails) of the power grid. In other embodiments, the plurality of nodes are located at intersections of a first ground net layer (e.g., upper ground rails) and a second ground net layer (e.g., lower ground rails) of the power grid.

The breach-detection circuitry can include logic circuitry to process signals from a subset of the plurality of nodes. For example, a signal from a respective node is indicative of a floating node or a change in voltage at the respective node. In various embodiments, a plurality of signals from a subset of the plurality of nodes are routed to the logic circuitry and the logic circuitry indicates whether a breach (e.g., tampering) has occurred based on the floating node detection or the change in voltage at one or more of the plurality of nodes. The logic circuitry can include a plurality of logic circuits that are arranged along multiple sides of the power grid and are arranged along a peripheral region of the at least one sensitive region. In specific embodiments, the logic circuitry includes OR gate circuitry coupled to the plurality of nodes. For example, the OR gate circuitry includes a plurality of OR gate circuits that generate a breach-detection signal in response to an output signal from at least one of the plurality of nodes that is indicative of a floating node.

The breach-detection circuitry can further include a breach detector. The breach-detection circuitry can respond to the event, such as erasing data from the portion of the IC in response to the detected event. The breach-detection circuitry can generate a signal indicative of the breach. The breach detector, which includes circuitry, responds to the detected event in response to the signal. Further, the breach-detection circuitry can detect the event by detecting breakage of the power grid in response to at least one of the plurality of nodes changing from being biased with supply power or ground to floating According to various aspects of the presented disclosure there is provided an apparatus including an IC having data storage means for storing data, a power means for distributing power to the IC, and a plurality of node means distributed over at least one sensitive region of the IC. The apparatus further includes breach-detection means for monitoring power grid integrity at the at least one sensitive region of the IC and detecting an event indicative of a breach by an external probe at a portion of the at least one sensitive region of the IC in response to a floating node detection or a change in voltage at one of the plurality of node means.

According to various aspects of the presented disclosure there is provided a method comprising monitoring a power grid configured to distribute power to circuitry of an IC using a plurality of nodes distributed over at least one sensitive region of the IC. The method further includes detecting an event indicative of a breach by an external probe at a portion of the at least one sensitive region of the IC in response to a floating node detection or a change in voltage at one of the plurality of nodes.

In a number of embodiments, detecting the event includes detecting breakage of the power grid in response to at least one node changing from being biased with supply power or ground to floating. For example, detecting the event includes detecting at least one of the plurality of nodes is biased with a power between a first voltage (VDD or ground) and a second voltage (VSS or VDD) of the power grid. Further, the method can include generating a breach detection signal in response to the detection and activating a breach detector in response to the breach detection signal. In response to the detected event, the method can include at least one of: erasing data at the portion of the sensitive region in response to the detected event, generating an alert and outputting the alert to external circuitry in response to the detected event, moving data stored at the portion of the sensitive region to a different location in response to the detected event, deactivating the IC in response to another event (e.g., use at a point of service (POS) circuitry or automated teller machine (ATM)), outputting another alert in response to the other event, and/or resetting the IC in response to the detected event.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 4A-6C illustrates examples of breach-detection circuitry, in accordance with the present disclosure.

Figure 1:
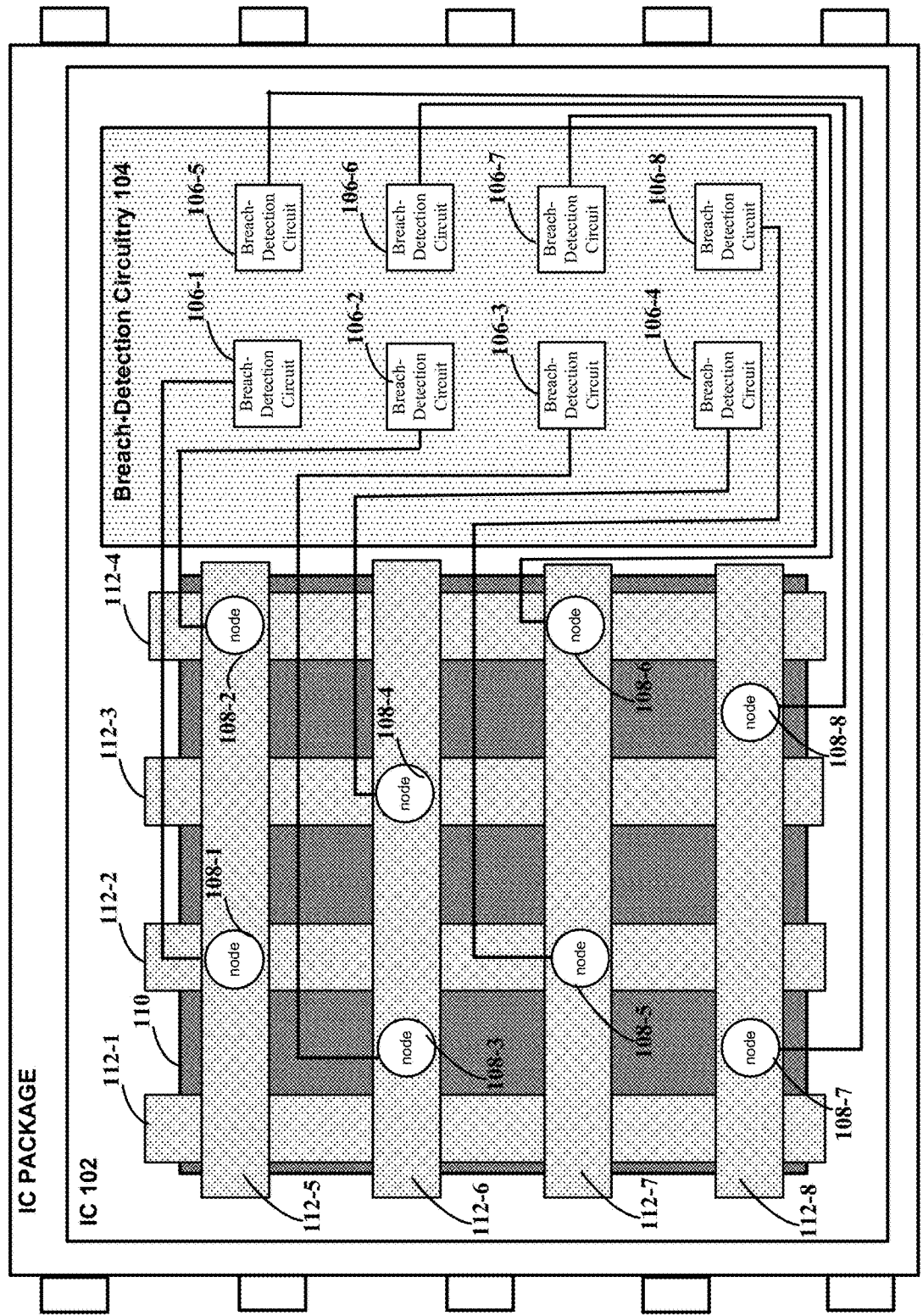
FIG. 1 is an apparatus-level diagram illustrating an example apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving monitoring power grid integrity of an integrated circuit (IC) for detection of a breach by an external probe. In certain implementations, aspects of the present disclosure have been shown to be beneficial when used in the context of ICs with sensitive regions that store security data. The power grid is present over the sensitive regions with a plurality of nodes distributed under the power grid and over the sensitive region. In some embodiments, a plurality of nodes are biased with supply power or ground, and responsive to breakage of the power grid at the sensitive region, at least one of the nodes changes to floating and/or changes voltage. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various ICs store security data at sensitive regions, such as personal data, financial transaction authorization codes, security passwords, and secure session keys. Because of the sensitive information, hackers may attempt unauthorized access to the IC to obtain the security data. As previously described, a technique for accessing sensitive regions of an IC is micro-probing using an external probe on the sensitive region. Various embodiments in accordance with present disclosure include a technique to detect a breach (e.g., tampering) by an external probe by using a plurality of nodes distributed over a sensitive region (e.g., one or more sensitive regions) of the IC and using the plurality of nodes to monitor power grid integrity at the sensitive region to detect a breach. For example, the nodes are used to detect a breach by biasing the nodes with supply power or ground using the power grid at the sensitive region. The nodes can be placed at intersections of the first and second layers of the power grid (e.g., upper and lower power supply rails or ground rails). Tampering or other breaches by an external probe results in breakage of portions of the power grid and at least one node that is located proximal to the breach can change to floating. For example, the at least one node changes from being biased with supply power or ground to floating. As the power grid is present at the sensitive regions, embodiments in accordance with the present disclosure can allow for signal routing over the sensitive region and can mitigate or prevent increases in current drops in the sensitive region due to the breach detection. Further, if a hacker attempts to access the sensitive region, the sensitive region appears the same as other regions as the power grid masks the sensitive region.

In response to the detected event, the IC can perform a variety of actions to prevent access to the security data and/or provide notification of the breach and/or tampering. The nodes can provide a signal indicative of the floating node or the change in voltage responsive to the breach. Breach-detection circuitry can process the signal and can perform an action in response to the signal. For example, the breach-detection circuitry can erase the security data at the sensitive region where a breach is suspected of occurring and/or erase security data at any sensitive region of the IC. In other embodiments, the breach-detection circuitry can generate and output an alert to external circuitry in response to the detected event, move security data stored at the portion of the sensitive region to a different location in response to the detected event, deactivate the IC in response to another event (e.g., use at a POS or ATM), output another alert in response to the other event, and/or reset the IC in response to the detected event, among other actions.

A number of embodiments are directed to an apparatus that includes an IC and breach-detection circuitry. The IC has data storage circuitry, including at least one sensitive region of the IC. The sensitive region of the IC stores security data. The IC further includes a power grid that distributes power to components of the IC including the data storage circuitry and a plurality of nodes. The power grid is present over the at least one sensitive region and the plurality of nodes are distributed over the at least one sensitive region. Further, the plurality of nodes are biased with supply power or ground using the power grid and can monitor power grid integrity.

The apparatus further includes breach-detection circuitry that monitors power grid integrity at the at least one sensitive region and detects an event indicative of a breach by an external probe at the at least one sensitive region. The event is detected, for example, in response to a floating node detection or a change in voltage at one of the plurality of nodes. For example, the plurality of nodes are located at intersections of a first portion (e.g., upper power supply rails or ground rails) and a second portion of the power grid (e.g., lower power supply rails or ground rails). The number of nodes can be a multitude that includes at least one node per intersection of the first and second layer of the power grid and as many as practically possible as is limited by the IC. The plurality of nodes are biased with supply power, ground, or another voltage using the power grid. When a hacker attempts to access a portion of the at least one sensitive region of the IC via micro-probing, the hacker may break the power grid at the respective portion. The breakage of the power grid floats at least one node that is proximal to the breach (e.g., the breakage of the power grid) as the nodes are placed over the sensitive region and under the power grid. For example, the respective node changes from being biased with supply power or ground to floating. Although the present embodiments illustrates floating node detection, embodiments are not so limited and can include detecting a change in voltage at one of the plurality of nodes.

In various embodiments, the breach-detection circuitry includes logic circuitry and a breach detector. In response to a node floating or changing voltage, the node generates a signal that is indicative of the floating node or the change in voltage. The logic circuitry can process signals from the nodes, such as a subset of the nodes. For example, signals from a subset of the plurality of nodes are routed to the logic circuitry. The logic circuitry indicates whether the event has occurred based on the signals. In some specific embodiments, the logic circuitry includes a plurality of logic circuits, such as OR gate circuits, that process signals from a subset of the plurality of nodes. The logic circuits are arranged along multiple sides of the power grid and along a peripheral region of the at least one sensitive region. The logic circuitry provides a breach-detection signal to the breach detector indicative of a detected event in response to a signal (from one of the subset of nodes) that is indicative of the floating node or the change in voltage. In response to the detected event, the breach detector can erase data from the sensitive region. Although embodiments are not limited to responding to the detected event by erasing data from the sensitive region. In other embodiments, the breach detector can alternatively and/or in addition to erasing data, generate an alert and output the alert to external circuitry, move data stored at the portion of the sensitive region to a different location in response to the detected event, deactivate the IC in response to another event (e.g., use at a POS or ATM), output another alert in response to the other event, and/or reset the IC in response to the detected event, among other actions.

In other related embodiments, a method includes monitoring a power grid that distributes power to circuitry of an IC using a plurality of nodes distributed over at least one sensitive region of the IC. The method further includes detecting an event indicative of a breach by an external probe at a portion of the at least one sensitive region of the IC in response to a floating node detection or a change in voltage at one of the plurality of nodes. For example, in response to tampering or other breaches by an external probe at the sensitive region, the power grid is broken (e.g., segments of the first and/or second layers of the power grid are broken). The plurality of nodes are distributed over the at least one sensitive region at intersections of the first and second layers of the power grid and biased with supply power or ground when no breach or power grid breakage has occurred. In response to the power grid breakage, at least one node can change from being biased with the supply power or ground to floating or otherwise changes voltage. Breach-detection circuitry detects the floating node or change in voltage, via a periodic enable signal or after powering up the IC, via a signal from the at least one node. In various specific embodiments, the breach-detection circuitry includes logic circuitry and a breach detector. The logic circuitry includes a plurality of logic circuits that process signals from a subset of the plurality of nodes and generate a breach-detection signal responsive to at least one of the signals indicating a floating node or a voltage change. The breach detector processes the breach-detection signal and responds to the detected event, such as by erasing data at the sensitive region or resetting the IC, among other actions.

Turning now to the figures, FIG. 1 is an apparatus-level diagram illustrating an example apparatus, in accordance with the present disclosure. The apparatus can include an IC 102 and breach-detection circuitry 104. The IC 102 has data storage circuitry for storing data. In various embodiments, the data storage circuitry includes at least one sensitive region 110. The sensitive region 110 stores security data that may be targeted by hackers.

As illustrated, the breach-detection circuitry 104 and the sensitive region 110 can be located within the die of the IC 102. Further, the IC 102 can include and/or be within an IC package. An IC package can include or refer to a case that encapsulates the IC 102. The IC package can protect the IC 102 from physical damage and corrosion. Further, the IC package can support the electrical contacts which connects the device to a circuit board.

Although the illustration of FIG. 1 (as well as FIGS. 2-3) illustrates an IC 102 with a single sensitive region, embodiments are not so limited. For example, the IC 102 can include a plurality of sensitive regions located throughout the IC 102. Further, as may be appreciated, the illustrations of the IC 102 may not show the entire IC and all data storage circuitry. Rather, for illustrative purposes, the figure illustrates a close up view of the IC 102 at one sensitive region 110.

The IC 102 further includes a power grid and a plurality of nodes 108-1, 108-2, 108-3, 108-4, 108-5, 108-6, 108-7, 108-8 (herein generally referred to as "the plurality of nodes 108") distributed over the sensitive region 110 of the IC 102. The power grid can include a first layer and a second layer. The first layer is formed by a first plurality of rails 112-1, 112-2, 112-3, 112-4 and the second layer is formed by a second plurality of rails 112-5, 112-6, 112-7, 112-8. The number of rails is not limited to the number illustrated by FIG. 1 and further is not limited to an equal number per layer. For example, the IC 102 may be rectangular shaped. The first layer and second layer of the power grid can include a first power supply layer and second power supply layer or a first ground net layer and second ground net layer. The rails can include upper power supply rails (VDD) and lower power supply rails (VSS) and/or upper ground rails (GND) and lower ground rails. The power grid provides power to components of the IC 102, including the sensitive region 110.

The plurality of nodes 108 are used to monitor power grid integrity. As illustrated, the plurality of nodes 108 are distributed over the sensitive region 110. The plurality of nodes 108 can be located at intersections of the first and the second layer of the power grid. In specific embodiments, the plurality of nodes 108 includes a multitude of nodes. A multitude of nodes can include at least one node per intersection of the first and second layer (e.g., upper and lower portions of the power grid) of the power grid that corresponds to the at least one sensitive region 110 and as many as is practically possible as is limited by the IC 102. For example, the number of nodes can be limited by the size of the IC 102, the size of the sensitive region 110, and/or the space available on the IC 102, among other limitations. Portions of the power grid that correspond to a sensitive region 110 can include or refer to portions of the rails of the power grid that are located over the sensitive region 110. For example, the nodes 108 are located at intersections of a first power supply layer (e.g., upper power supply rails) and a second power supply layer (e.g., lower power supply rails) of the power grid. In other embodiments, the nodes 108 are located at intersections of a first ground net layer (e.g., negative or upper ground rails) and a second ground net layer (e.g., negative or lower ground rails) of the power grid. In other related embodiments, the plurality of nodes 108 can alternatively and/or in addition be distributed at locations other than the intersections of the power grid. For example, the plurality of nodes 108 can be distributed and connected to the power grid at locations to cover the sensitive region 110 that are not limited to the intersections of the first and second layer of the power grid.

The plurality of nodes 108 are biased, using the power grid, to monitor power grid integrity. For example, the plurality of nodes 108 are biased with supply power or ground. The nodes 108 can be located between the sensitive region 110 and the power grid. The nodes 108, for instance, can be located over the sensitive region 110 and under the power grid (e.g., at the intersections of the first and second layers) to protect the IC 102 from tampering and/or a breach via an external probe.

The plurality of nodes 108 can be distributed over the sensitive region 110 with separation between one another that is small enough that penetration of the power grid by an external probe at any portion of sensitive region 110 is detected by the plurality of nodes. For example, the nodes 108 are placed at the intersections of the first and second layers of the power grid and over the sensitive region 110 such that the nodes are used to detect breakage of the power grid by an external probe. The nodes 108, in specific embodiments, are provided at intersections of the two layers of the power grids, such as located under intersections of an upper layer and a lower layer of the power grid and over the at least one sensitive region 110. The nodes 108, in specific embodiments, can alternatively or in addition be located at as many locations as necessary to cover the sensitive region 110, which are not limited to the intersections of the power grid. In order for the hacker to access the sensitive region 110, the external probe penetrates a portion of the power grid. If the external probe penetrates a portion (or more) of the power grid corresponding to the sensitive region 110, at least one of the plurality of nodes 108 may become a floating node and/or may change voltage. For example, a particular node that is located at or connected to the portion of the power grid that is broken by the external probe may change from being biased with supply power or ground to floating. In some specific embodiments, the particular node is floating with a power between a first voltage corresponding with a first layer of the power grid (e.g., VDD or ground) and a second voltage corresponding with a second layer of the power grid (e.g., VSS or VDD).

Breach-detection circuitry 104 monitors the power grid integrity at the at least one sensitive region 110 and detects an event indicative of a breach by an external probe. For example, the event is detected in response to a floating node detection or a change in voltage at one of the plurality of nodes 108. The plurality of nodes 108 can generate a signal indicative of a floating node or a change in voltage at the respective node, which can be detected by the breach-detection circuitry 104. Further, the plurality of nodes 108 (e.g., each node) can be coupled to breach-detection circuitry 104 (e.g., breach detection circuits) to process a signal (e.g., a voltage value) at the respective node.

In various embodiments, the breach-detection circuitry 104 can include a plurality of breach-detection circuits 106-1, 106-2, 106-3, 106-4, 106-5, 106-6, 106-7, 106-8 (herein generally referred to as "the plurality of breach-detection circuits 106"). A breach-detection circuit can be coupled to the plurality of nodes 108. For example, a plurality of breach-detection circuits 106 can be coupled together and provide output signals in response to a floating node detection or voltage change at one of the plurality of nodes 108. The breach-detection circuitry 104, in some embodiments, is coupled to the plurality of nodes 108 and provides an output signal in response to an enable signal provided and/or power up of the IC 102, as further described herein. The output signal indicates no breach in response to the node and/or the plurality of nodes being biased with supply power or ground and indicates a breach in response to the node floating and/or being biased with a changed voltage. The output signal is routed to other circuitry of the breach-detection circuitry 104, in various embodiments.

The breach-detection circuitry 104 can further include logic circuitry that processes signals from a subset of the plurality of nodes 108. In some embodiments, the logic circuitry includes OR gate circuitry. The plurality of signals from a subset of the plurality of nodes 108 are routed to the logic circuitry (e.g., an OR gate) via the breach-detection circuits 106. The logic circuitry indicates whether the event is occurring based on the floating node detection or voltage at one of the plurality of nodes 108. For example, the logic circuits are configured to generate a breach-detection signal in response to an output signal from at least one of a subset of the plurality of nodes 108 (via a respective breach-detection circuit) that is routed to the respective logic circuit being indicative of a floating node or a change in voltage. The logic circuits, as further illustrated by FIG. 2, can be arranged along a peripheral region of the at least one sensitive region 110.

Figure 2:
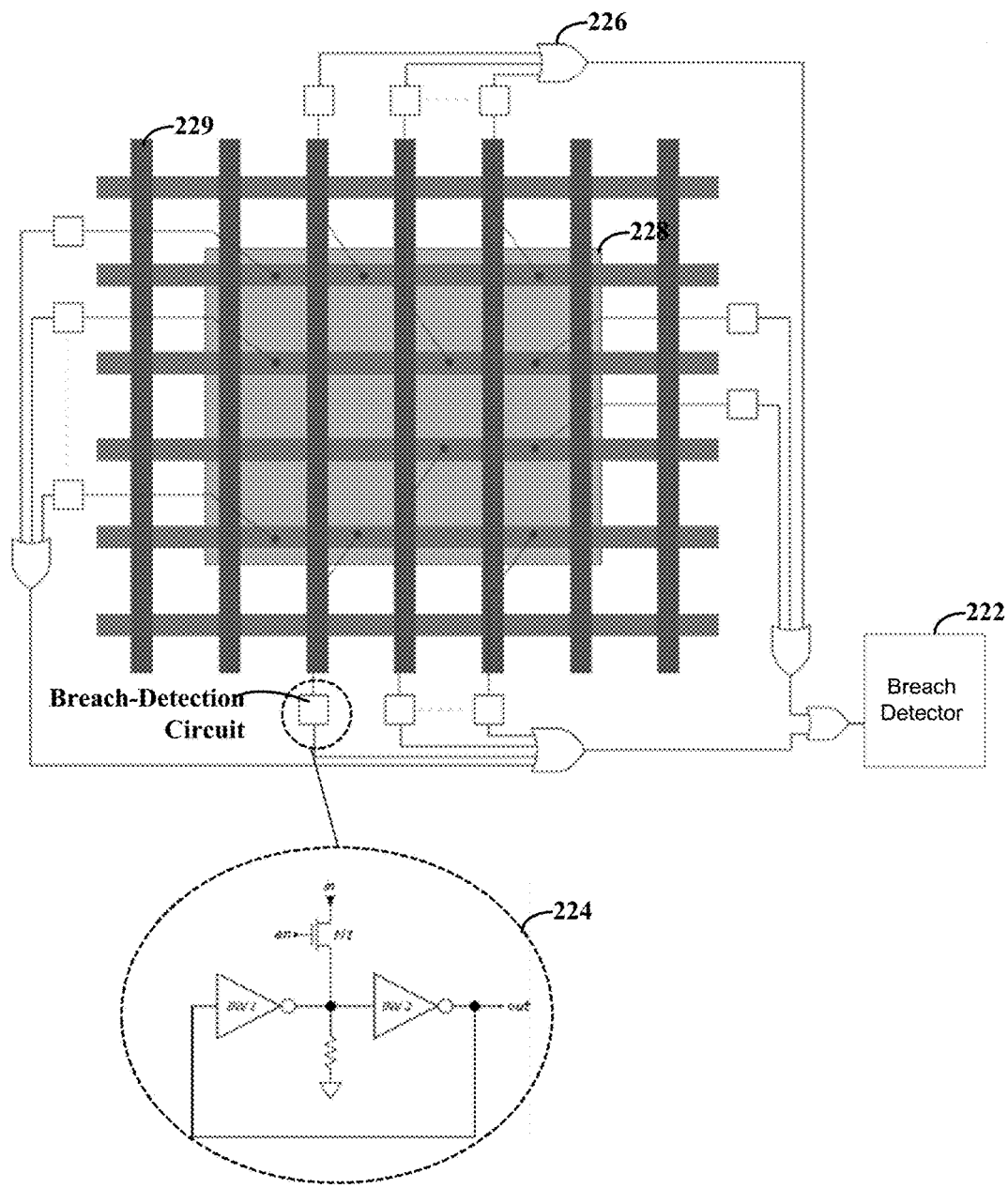
FIG. 2 is an apparatus-level diagram illustrating an example of a sensitive region of an IC and breach-detection circuitry in accordance with the present disclosure.

The breach-detection circuitry 104 can additionally include a breach detector (as illustrated by FIG. 2). The breach detector includes circuitry and can respond to the detected event in response to a signal indicative of a breach by the breach-detection circuitry (e.g., a breach-detections signal). As previously described, the event can be detected by detecting a breakage of the power grid and in response to at least one of the plurality of nodes changing from being biased with supply power or ground to floating. The breach detector can respond to the detected event by erasing data from the portion of the IC 102, all data from the sensitive region 110, and/or all data from any sensitive region of the IC 102. However embodiments are not so limited and can include a variety of actions in response to the detected event that is indicative of a breach and/or of tampering. For example, the breach-detection circuitry 104 can, alternatively and/or in addition, generate and output an alert to external circuitry in response to the detected event, move data stored at the portion of the sensitive region 110 and/or all data of the sensitive region 110 to a different location of the IC in response to the detected event, deactivate the IC in response to another event (e.g., use as POS or ATM), output another alert in response to the other event, and reset the IC in response to the detected event.

The plurality of nodes 108 distributed over the sensitive region 110 are used to monitor power grid integrity and are biased with supply voltage or ground. In order for a hacker to access the sensitive region 110, using an external probe, the hacker gets rid of and/or otherwise breaks power segments of the power grid to access the security data stored on the sensitive region 110. The plurality of nodes 108 are distributed over the sensitive region 110 and under the power grid. In response to breakage of a power segment, an alert is generated if one of the plurality of nodes are left floating. The power grid over the sensitive region 110 provides power routing and may not result or may mitigate increase in current drops due to breach detection. Further, as the power grid is utilized to detect a breach or tampering and the nodes 108 are located under the power grid, the sensitive region 110 appears the same as other regions of the IC 102 and may be more difficult for a hacker to identify the location of the sensitive region 110.

FIG. 2 is an apparatus-level diagram illustrating an example of a sensitive region of an IC and breach-detection circuitry, in accordance with the present disclosure. As illustrated, the IC includes at least one sensitive region 228 that stores security data. To prevent access of the security data by a hacker, using an external probe, the integrity of the power grid 229 over the sensitive region 228 is monitored using a plurality of nodes. The plurality of nodes, as previously illustrated and described in connection with FIG. 1, are distributed over the sensitive region 228 and under the power grid 229 corresponding to the sensitive region 228. The plurality of nodes can be biased with supply power or ground.

The plurality of nodes are distributed and connected to the power grid 229, and distributed over the sensitive region 228 of the IC. In some embodiments, the plurality of nodes are distributed at intersections of the two layers of the power grid 229. A hacker, attempting to access the sensitive region 228 with an external probe, can break the power grid. As the nodes are distributed at the intersection of the two layers of the power grid and biased using the power grid, breakage of the power grid at a segment corresponding to the sensitive region 228 may result in a floating node. For example, at least one of the plurality of nodes, which is located proximal to the breakage of the power grid, changes from being biased with supply power or ground to floating.

As illustrated by FIG. 2, the plurality of nodes are connected to breach-detection circuitry. The breach-detection circuitry can include a plurality of breach-detection circuits, logic circuitry, and a breach detector 222. Each node, for example, can be coupled to a particular breach-detection circuit. The breach-detection circuit responds to the floating node or change in voltage at the respective node by generating a signal indicative of breach or tamper detection. FIG. 2 illustrates a close up view of an example breach-detection circuitry 224, as further described in connection with FIGS. 4-6.

The signals from particular breach-detection circuits are routed to logic circuitry. The logic circuitry can include a plurality of logic circuits that process a subset of the plurality of signals generated by the nodes and the breach-detection circuit. As illustrated by the example logic circuit 226, a plurality of signals from a subset of the plurality of nodes are routed to each logic circuit. The logic circuits process the plurality of signals and in response to at least one of the plurality of signals indicating a floating node or change in voltage at one of the subset of the plurality of nodes, the logic circuit generates a breach-detection signal. The logic circuits can be arranged along multiple sides of the power grid 229 corresponding to the sensitive region 228. Further, the logic circuits can be arranged along a peripheral region of the at least one sensitive region 228.

The breach-detection signal from one or more of the plurality of logic circuits (e.g., logic circuit 226) is routed to the breach detector 222. The breach detector 222 includes circuitry that responds to the breach-detection signal by activating. For example, the breach detector 222 can activate by performing an action in response to the breach-detection signal. The action can include erasing data in the sensitive region 228, erasing a portion of data in the sensitive region 228, and/or erasing all data in all sensitive regions of the IC, among other actions. Alternatively and/or in addition, the action can include generating and outputting an alert to external circuitry in response to the detected event, moving data stored at the portion of the sensitive region 228 and/or all data of the sensitive region 228 to a different location of the IC in response to the detected event, deactivating the IC in response to another event (e.g., use of the IC at an POS or ATM), outputting another alert in response to the other event, and/or resetting the IC in response to the detected event, among other actions.

Figure 3A:
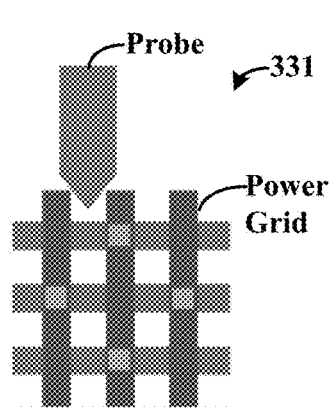
FIGS. 3A-3C illustrates an example of a breach of a sensitive region of an apparatus, in accordance with the present disclosure.
Figure 3B:
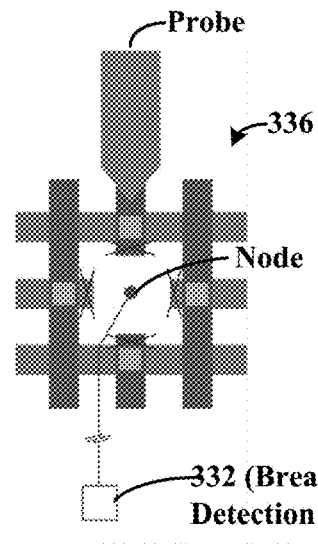
Figure 3C:
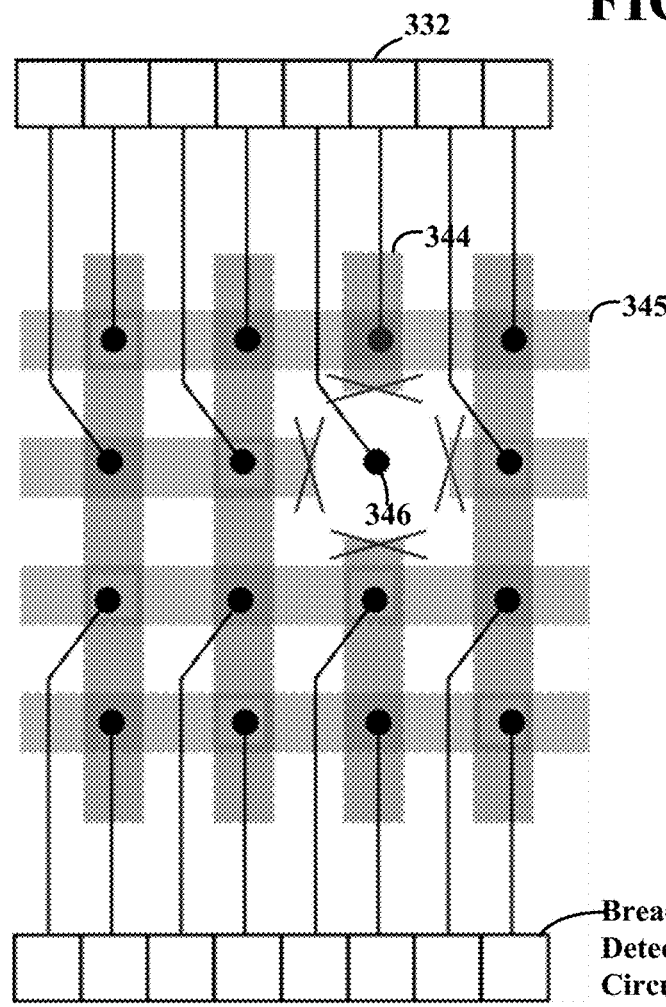

FIGS. 3A-3C illustrates an example of a breach of a sensitive region of an apparatus, in accordance with the present disclosure. As illustrated at 331 of FIG. 3A, a hacker may use an external probe to attempt to access a sensitive region of an IC. The sensitive region of the IC includes a plurality of nodes distributed over the sensitive region and under the power grid to monitor power grid integrity, as previously described.

At 336 of FIG. 3B, in the attempt to access the sensitive region of the IC, the hacker breaks a power segment of the power grid using the external probe. As illustrated, one of the plurality of nodes distributed over the sensitive region is located proximal to the power segment break. As further described herein, the particular node changes from being biased with supply power or ground, via the power segment, to floating. A breach-detection circuit 332 which is coupled to the particular node detects the floating node and/or change in voltage and generates a signal indicative of a breach in response.

As illustrated at 340 of FIG. 3C, the power segment break includes breaking of at least a segment of the first layer 344 and/or a segment of the second layer 345 of the power grid. The node 346 that is located at the intersection of the segment of the first layer 344 and the segment of the second layer 345 changes from being biased with supply power or ground to floating in response to the breach. When an enable signal is provided and/or the IC is powered up, the breach-detection circuit 332 coupled to the node 346 outputs a signal indicative of the breach responsive to the floating node and/or voltage change at the node 346.

FIGS. 4A-6C illustrate examples of breach-detection circuitry, in accordance with the present disclosure. The circuitry illustrated by FIGS. 4A-6C include specific detailed examples of breach-detection circuitry. However, embodiments in accordance with the present disclosure are not so limited and can include a variety of circuitry configured to monitor the power grid integrity at a sensitive region of the IC. The breach-detection circuitry can include a plurality of breach-detection circuits that are coupled to particular nodes.

Figure 4A:
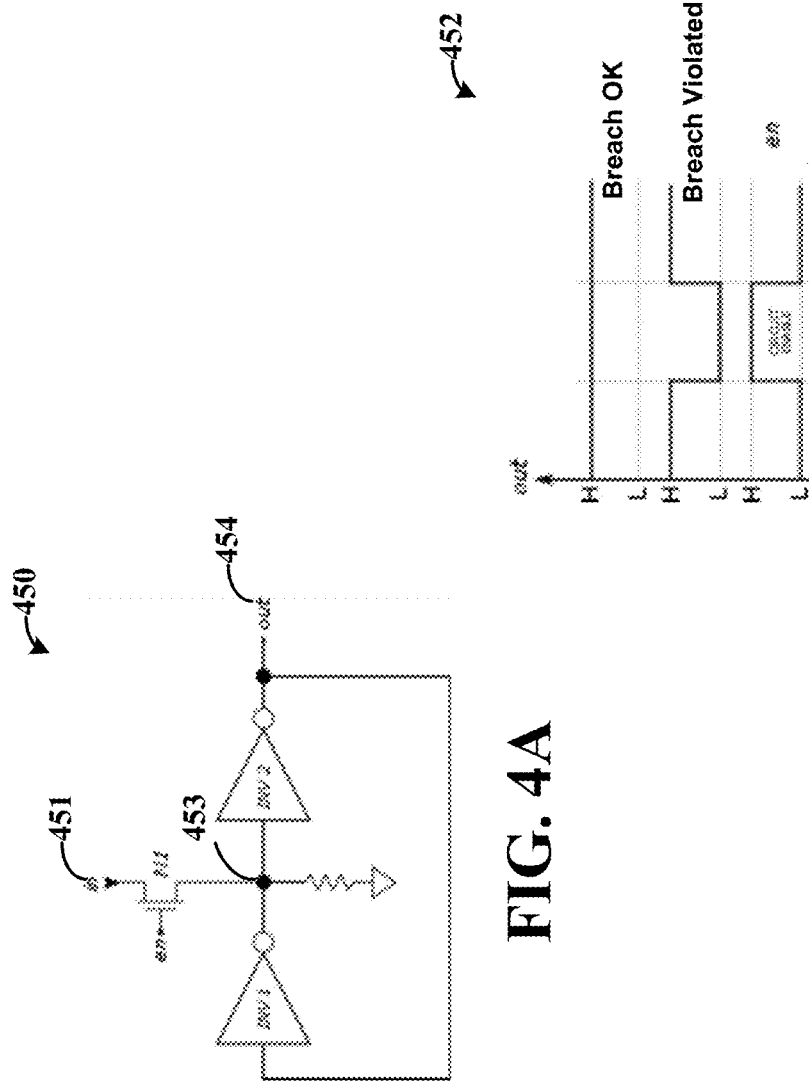
Figure 4B:
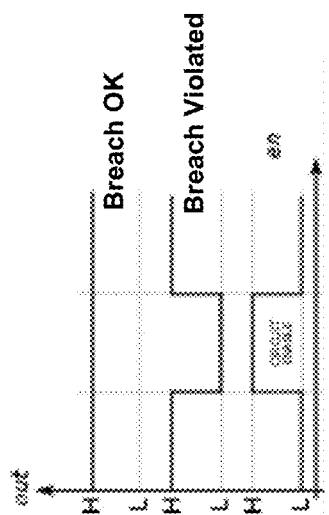

FIGS. 4A-4B illustrates of an example of a breach-detection circuit configured to generate a signal indicative of a breach in response to a respective node floating or changing voltage. The breach-detection circuit 450 as illustrated by FIG. 4A can be a standard cell (e.g., around 1.5 um by 0.8 um) and can be placed and routed by backend tools. A particular node is coupled to an input 451 of the breach-detection circuit 450. For example, the input 451 is coupled to a first terminal (e.g., source) of a transistor circuit. The transistor circuit is controlled via a gate voltage applied to the gate of the transistor circuit, which acts as an enable signal (en). In response to the breach-detection circuit 450 being enabled, the particular node (e.g., a sense point of the power grid) is checked by the breach-detection circuit 450. The second terminal (e.g., drain) of the transistor circuit is coupled to inverter circuitry that inverts the output from the transistor circuit and the inverted value is output as an output signal 454.

FIG. 4B illustrates an example timing diagram of the breach-detection circuitry 450 illustrated by FIG. 4A. As illustrated by 452 of FIG. 4B, the output signal 454 of the breach-detection circuit 450 is indicative of a breach or lack of a breach. In some embodiments, a low output signal is indicative of a breach and a high output signal is indicative of no breach. Although embodiments are not so limited and a low output signal can be indicative of no breach and a high output signal can be indicative of a breach. As a specific example, when a breach has not occurred, the particular node is biased with supply power (e.g., VDD) or ground, in some embodiments. When an enable signal is provided (as a gate voltage), current flows through the transistor circuit that corresponds with the supply power (or ground) and is output to another node 453 coupled to the inverter circuitry. The input to the inverter circuitry corresponds with the supply power (or ground) (e.g., lower or higher current at the other node 453 as compared to when the particular node is floating), which is inverted and output as an output signal 454. When a breach has occurred, the particular node can be floating with a value that is different (e.g., higher or lower) than the supply power or ground value. When an enable signal is provided (as a gate voltage), the input to the inverter circuitry is different as compared to when the node is biased with supply power or ground (e.g., different current at the other node 453 when the particular node is floating as compared to when the particular node is biased with supply power or ground), which is inverted and output as the output signal 454. The output signal 454 is an inverse value when the node is floating as compared to when the node is not floating (e.g., "high" and "low" and/or "0" and "1"). In specific embodiments, when the particular node is floating, current flows through the transistor circuit that is greater or less than when the particular node is biased with supply power.

The breach-detection circuit 450 can include circuitry to drive the output signal 454. For example, the breach-detection circuit 450 can include two inverter circuits INV1 and INV2. When an enable signal is provided, current flowing through the transistor circuit is output to the other node 453 that is coupled to the input of the second inverter circuit INV2. Based on the current at the other node 453, the second inverter circuit INV2 outputs a value (e.g., high or low) used for the output signal 454. Feedback from INV2 is used to drive the output signal 454 faster than without the feedback. The output from INV2 can be feedback to the first inverter circuit INV1. INV1 inverts the value and outputs the inverted value on the other node 453 that is coupled to the input of INV2.

As a specific example, if the node is floating and responsive to an enable signal, current flowing through the transistor circuit is greater (or less) than if the node is biased with supply power or ground and the input to INV2 is high. INV2 inverts the input (e.g., a high input) to a low output, which is feedback to INV1. The input to INV1 is low, which is inverted to a high output at the other node 453 coupled to INV2 and drives the output signal 454 (e.g., low signal that is indicative of a breach) faster.

Although the present embodiment illustrates one breach-detection circuit 450 embodiments are not so limited. For example, each of the plurality of nodes distributed over a sensitive region of the IC can be coupled to a respective breach-detection circuit. When the breach-detection circuit is enabled (via the enable signal), the breach-detection circuitry checks all sense points of the power grid (e.g., to check each of the plurality of nodes for floating node detection or a change in voltage). Further, the timing diagram illustrated by FIG. 4B can effectively be inversed (e.g., resulting in the timing diagram illustrated by FIG. 6B) without departing from the technical disclosure, as further described herein.

FIGS. 5A-5B illustrates an example of a breach-detection circuit configured to generate a signal indicative of a breach in response to a respective node floating or changing voltage. The breach-detection circuit 556 illustrated by FIG. 5A is enabled in response to a power up of the IC.

An output of a particular node is coupled to an input 557 (e.g., another node) of the breach-detection circuit 556. For example, responsive to a power up of the IC, the input 557 (the node "outb") powers up at logic "0" if the power grid is intact and logic "1" if a power segment breakage occurs. An output signal 558 is based on an inverted value of the input 557 at power up (e.g., "1" or a high value if the power grid is intact and "0" or a low value if a power breakage has occurred). Although embodiments are not so limited. As an enable signal is not used and the power grid is monitored at power up, the breach-detection circuit 556 may not consume power.

For example, as illustrated by 559 of FIG. 5B, the breach-detection circuit 556 can include capacitive voltage division circuitry. The capacitors Cp and Cn are transistor parasitics. The voltage at the node 560 "outb" (e.g., Voutb) can be equal to $Vdd*Cp/(Cn+Cp+C2)$. In various embodiments, the voltage at the node 560 (e.g., Voutb) can be less than $0.1*Vdd$. The voltage at the node "out" 561 (e.g., Vout) can be equal to $Vdd*(Cp+C1)/(Cn+Cp+C1)$. In a number of embodiments, Voutb is greater than $0.9*Vdd$. The capacitive voltage division circuitry can, for example, slow down the output at the node 560 responsive to the power up of the IC. In a number of specific embodiments, Voutb is less than $2/3$ of Vdd (e.g., Vhigh) (e.g., 10% of Vdd is less than 66% of Vdd). Further, Vout is greater than $1/3$ of Vdd (e.g., Vlow) (e.g., 90% of Vdd is greater than 33% of Vdd).

FIGS. 6A-6C illustrates another example of a breach-detection circuit configured to generate a signal indicative of a breach in response to a respective coupled node floating or changing voltage. Similarly to FIG. 4A, the breach-detection circuit 680 as illustrated by FIG. 6A can include circuitry to drive an output signal 685 and responsive to an enable signal 686 (e.g., the various transistor circuitry). Further, as illustrated by 683, a plurality of detection circuits are enabled via the enable signal 690, as further described herein.

A particular node is coupled to an input 684 of the breach-detection circuit 680, and the input 684 is coupled to transistor circuitry which controls the output signal 685. The breach-detection circuit 680 can be enabled via the enable signal (en) 686. In response to the breach-detection circuit 680 being enabled, the particular node (e.g., a sense point of the power grid) is checked by the breach-detection circuit 680. For example, a high or low signal is output (e.g., as output signal 685) based on a bias of the particular node (e.g., biased with supply power, ground or floating).

FIG. 6B illustrates an example timing diagram of the breach-detection circuitry 680 illustrated by FIG. 6A. The timing diagram illustrated by FIG. 6B is effectively the inverse of the timing diagram illustrated by FIG. 4A and, thus, it is appreciated that the exemplary circuits shown in FIG. 4A and FIG. 6A can be changed accordingly and/or correlate with either timing diagram illustrated by FIG. 4B and FIG. 6B without departing from the technical disclosure. As illustrated by 682 of FIG. 6B, the output signal 685 of the breach-detection circuit 680 can be indicative of a breach or lack of a breach. In some embodiments, a high output signal is indicative of a breach and a low output signal is indicative of no breach. Although embodiments are not so limited. As a specific example, when no breach is occurring, the particular node is biased with supply power (VDD) or ground. When an enable signal is provided (as a gate voltage), the output signal 685 is low (e.g., "0"). By contrast, when a breach occurs, the particular node is floating with a value that is different (e.g., greater or less than) than the supply power or ground value. When an enable signal 686 is provided (e.g., a gate voltage), the output signal 685 is high (e.g., "1") as compared to when no breach occurs. A breach detector can respond to the output signal 685 from the breach-detection circuit 680, as previously described.

As illustrated by FIG. 6C, the breach-detection circuitry 683 can include a plurality of breach-detection circuits in various embodiments. Each breach-detection circuit is coupled to a respective node. For example, the nodes are coupled to inputs 691-1, 691-2, 691-3 of the breach-detection circuitry 683, and each breach-detection circuit of the breach-detection circuitry 683 can control a respective output signal 692-1, 692-2, 692-3. The breach-detection circuitry 683 is enabled via an enable signal (en) 690. In response to the enable signal 690, each breach-detection circuit of the breach-detection circuitry 683 can provide an output signal 692-1, 692-2, 692-3. The output signals 692-1, 692-2, 692-3 are indicative of a breach or no-breach as described above with respect to the breach-detection circuit 680. For example, in response to the enable signal 690, the sense points (e.g., all) of the power grid are checked. Each breach-detection circuit can consume around 0.1 uA. Although the present embodiment illustrates three nodes coupled to three breach-detection circuits, embodiments are not so limited and can include more or less nodes and breach-detection circuits than illustrated.

Various embodiments in accordance with the present disclosure utilize the power grid to detect a breach and/or tampering by an external probe at a sensitive region of an IC. Multiple nodes are used to monitor power grid integrity by placing the nodes under the power grid, such as at intersections of layers of the power grid and/or other locations, and biasing the nodes with supply power or ground. When a breach and/or tampering occurs, at least one node can change from being biased with the supply power or ground to floating or otherwise change voltage as the hacker breaks a power segment corresponding to the sensitive region. The breach-detection circuitry responds to the floating node or change in voltage. As the power grid is present over the sensitive region, security against micro-probing is provided without causing (or by mitigating) power grid related issues (e.g., IR drop) or adding active or static signals over critical access points. Further, the one or more sensitive regions appear the same as other regions of the IC to the hacker, thus making it more difficult for the hacker to identify what regions are being protected.

Breach-detection circuitry and breach-detection circuits in accordance with the present disclosure are not limited to those illustrated by FIGS. 4A-6C and can include a variety of circuitry that monitors the power grid and can be implemented in a variety of different ways. FIGS. 4A-6C are provided for illustrative purposes and are not intended to limit the scope of the disclosure. For example, a breach-detection circuit can include a variety of circuitry configured to generate a signal indicative of a breach in response to a respective node floating or changing voltage.

The apparatus and various circuitry, as illustrated and described herein, such as by FIGS. 1-6C, can be used to perform various methods. In various embodiments, the method includes monitoring a power grid configured to distribute power to circuitry of an IC using a plurality of nodes distributed over at least one sensitive region of the IC. The method further includes detecting an event indicative of a breach by an external probe at a portion of the at least one sensitive region of the IC in response to a floating node detection or a change in voltage at one of the plurality of nodes.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner. It might be appreciated that, with reference to IC package, such as illustrated by FIG. 1, the exemplary circuitry illustrated herein may be implemented in a single chip or multiple chip package (e.g., two chip package). An IC can include or refer to an assembly of electronic components. For example, an IC can include an IC chip, a multi-chip IC, etc. ICs can be used as microprocessors, within audio and video equipment, smartcards, automobiles, etc. Electronic components can include resistors, transistors, capacitors, etc.

For the purposes of this document, the following terms and definitions apply: hacker includes or refers to a person or instrument attempting to access security data; microprobing includes or refers to forming an electrical contact with the IC by dropping an external probe, such as a fine-tipped probe needle, directly on a portion of the IC; external probe includes or refers to a blunt object used to probe the IC, such as fine-tipped probe needle; a breach includes or refers to power segment breakage of the power grid to access data on the IC and/or an attempt to do the same; security data includes or refers to sensitive or secure data; a power grid includes or refers to rails that distribute power to a circuitry; floating node includes or refers to a node that is not actively biased with a voltage; a sensitive region includes or refers to data storage circuitry that stores security data.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller and/or other circuit-type depictions (e.g., reference numerals 104 and 222 of FIGS. 1 and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi-)programmable circuits) configured and arranged for implementing these operations/activities, as may be carried out in the approaches shown in FIG. 3. In certain embodiments, such illustrated items represent one or more computer circuitry (e.g., microcomputer or other CPU) which is understood to include memory circuitry that stores code (program to be executed as a set/sets of instructions) for performing a basic algorithm (e.g., generate a signal indicative of a breach and detecting an event in response to the signal) or the more complex process/algorithm as described at FIGS. 3A-3C to perform the related steps, functions, operations, activities, etc. The specification may make reference to an adjective that is intended to connote an attribute of the structure (e.g., breach-detection circuitry), in which case the adjective (e.g., breach detection) refers to at least a portion of the named structure (e.g., circuitry) being configured to have/perform that attribute (e.g., detect a breach event).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, breach-detection circuitry can include one or more of the breach-detection circuits illustrated by FIGS. 4A-6C. Such modifications do not depart from the true spirit and scope of various aspects of the disclosure, including aspects set forth in the claims.

What is claimed is:

1. An apparatus comprising:
   an integrated circuit (IC) having:
      data storage circuitry;
      a power grid configured to distribute power to the data storage circuitry; and
      a plurality of nodes distributed over at least one sensitive region of the IC, the plurality of nodes being biased with one of a first voltage and a second voltage corresponding with the power grid; and
   breach-detection circuitry configured and arranged to monitor power grid integrity at the at least one sensitive region of the IC and detect an event indicative of a breach by an external probe at a portion of the at least one sensitive region in response to a floating node detection or a change in voltage to a value between the first voltage and the second voltage at one of the plurality of nodes;
   wherein the breach-detection circuitry is configured and arranged to detect the event by detecting breakage of the power grid in response to at least one of the plurality of nodes changing from being biased with supply power or ground to floating to a value between the supply power and ground.

2. The apparatus of claim 1, wherein the plurality of nodes includes a multitude of nodes, the multitude of nodes including at least one node per intersection of first and second layers of the power grid corresponding to the at least one sensitive region and as many as practically possible as is limited by the IC, wherein the first and second layers each include a plurality of rails, the multitude of nodes being between the at least one sensitive region of the IC and the power grid.

3. The apparatus of claim 1, wherein the breach-detection circuitry further includes logic circuitry configured and arranged to process signals from a subset of the plurality of nodes, wherein a signal from a respective node is indicative of a floating node or a change in voltage at the respective node, wherein the power grid is configured and arranged to provide power routing to the IC, including the distribution of power to the data storage circuitry.

4. The apparatus of claim 3, wherein a plurality of signals from a subset of the plurality of nodes are routed to the logic circuitry configured and arranged to indicate whether the event indicative of the breach has occurred based on the floating node detection or the change in voltage at one or more of the subset of the plurality of nodes, and wherein the power grid is further configured and arranged to mitigate increases in current drops in response to the detected event that is indicative of the breach by the external probe.

5. The apparatus of claim 1, wherein the breach-detection circuitry further includes a plurality of logic circuits configured and arranged to process signals from a subset of the plurality of nodes, wherein the plurality of logic circuits are arranged along multiple sides of the power grid, and arranged along a peripheral region of the at least one sensitive region.

6. The apparatus of claim 1, wherein the breach-detection circuitry further includes a breach detector, including circuitry, configured and arranged to erase data from the portion of the IC in response to the detected event.

7. The apparatus of claim 1, wherein the breach-detection circuitry is further configured and arranged to generate a signal indicative of the breach, wherein the at least one sensitive region of the IC is configured and arranged to store security data and wherein the power grid is present over the at least one sensitive region; and
   wherein the breach-detection circuitry further includes a breach detector, including circuitry, configured and arranged to respond to the detected event in response to the signal.

8. The apparatus of claim 1, wherein the plurality of nodes are located at intersections of a first power supply layer and a second power supply layer of the power grid.

9. The apparatus of claim 1, wherein the plurality of nodes are located at intersections of a first ground net layer and a second ground net layer of the power grid.

10. The apparatus of claim 1, wherein the breach-detection circuitry further includes OR gate circuitry coupled to the plurality of nodes and configured to generate a breach-detection signal in response to an output signal from at least one of the plurality of nodes that is indicative of a floating node.

11. The apparatus of claim 1, wherein the plurality of nodes are distributed and connected to the power grid, and distributed over the sensitive region.

12. A method comprising:
monitoring a power grid configured to distribute power to circuitry of an integrated circuit (IC) using a plurality of nodes distributed over at least one sensitive region of the IC, wherein each of the plurality of nodes are biases with one of a first voltage and a second voltage corresponding with the power grid; and
detecting an event indicative of a breach by an external probe at a portion of the at least one sensitive region of the IC in response to a floating node detection or a change in voltage to a value between the first voltage and the second voltage at one of the plurality of nodes;
wherein detecting the event includes detecting at least one of the plurality of nodes is biased with a power between the first voltage and the second voltage corresponding with the power grid.

13. The method of claim 12, wherein detecting the event includes detecting breakage of the power grid in response to at least one node changing from being biased with supply power or ground to floating, and wherein the plurality of nodes are between the at least one sensitive region and the power grid.

14. The method of claim 12, further including generating a breach-detection signal in response to the detection and activating a breach detector, including circuitry, in response to the breach-detection signal.

15. The method of claim 12, the method further including at least one of: erasing data at the portion of the sensitive region in response to the detected event, generating an alert and outputting the alert to external circuitry in response to the detected event, moving data stored at the portion of the sensitive region to a different location in response to the detected event, deactivating the IC in response to another event, outputting another alert in response to the other event, resetting the IC in response to the detected event, and a combination thereof.

16. The method of claim 12, further including providing the plurality of nodes at intersections of two layers of the power grid, under the power grid, and at the sensitive region of the IC, and further including providing power routing to the IC and mitigating increases in current drops in response to the detected event.

17. The method of claim 12, further including erasing data from at least the portion of the sensitive region responsive to the detected event.

18. A method comprising:
monitoring a power grid configured to distribute power to circuitry of an integrated circuit (IC) using a plurality of nodes distributed over at least one sensitive region of the IC, wherein each of the plurality of nodes are biases with one of a first voltage and a second voltage corresponding with the power grid; and
detecting an event indicative of a breach by an external probe at a portion of the at least one sensitive region of the IC in response to a floating node detection or a change in voltage to a value between the first voltage and the second voltage at one of the plurality of nodes;
wherein detecting the event includes detecting breakage of the power grid in response to at least one node changing from being biased with supply power or ground to floating, and wherein the plurality of nodes are between the at least one sensitive region and the power grid.

* * * * *